(12) United States Patent
MacDonald, II

(10) Patent No.: US 9,714,373 B2
(45) Date of Patent: Jul. 25, 2017

(54) UREA HYDROCHLORIDE COMPOSITIONS

(71) Applicant: Green Products & Technologies, L.L.C., Melbourne, FL (US)

(72) Inventor: John T. MacDonald, II, Grant, FL (US)

(73) Assignee: Green Products & Technologies, L.L.C., Melbourne, FL (US)

( * ) Notice: Subject to any disclaimer, the term of this patent is extended or adjusted under 35 U.S.C. 154(b) by 0 days.

(21) Appl. No.: 15/164,478

(22) Filed: May 25, 2016

(65) Prior Publication Data

US 2016/0264844 A1    Sep. 15, 2016

Related U.S. Application Data

(60) Division of application No. 14/593,333, filed on Jan. 9, 2015, now Pat. No. 9,365,810, which is a continuation of application No. 14/142,975, filed on Dec. 30, 2013, now Pat. No. 8,940,106, which is a continuation-in-part of application No. 14/048,559, filed on Oct. 8, 2013, now Pat. No. 8,784,573, which is a division of application No. 13/856,469, filed on Apr. 4, 2013, now Pat. No. 8,580,047, which is a division of application No. 13/453,871, filed on Apr. 23, 2012, now Pat. No. 8,430,971, which is a division of application No. 13/104,180, filed on May 10, 2011, now Pat. No. 8,163,102, which is a continuation-in-part of application No. 12/419,379, filed on Apr. 7, 2009, now Pat. No. 7,938,912.

(51) Int. Cl.
| | | |
|---|---|---|
| *C11D 1/72* | (2006.01) | |
| *C11D 3/20* | (2006.01) | |
| *C11D 3/44* | (2006.01) | |
| *C09K 8/528* | (2006.01) | |
| *C11D 7/50* | (2006.01) | |
| *C11D 1/62* | (2006.01) | |
| *C11D 3/04* | (2006.01) | |
| *C11D 3/30* | (2006.01) | |
| *C11D 3/32* | (2006.01) | |
| *C11D 11/00* | (2006.01) | |
| *B01D 41/04* | (2006.01) | |
| *C23G 1/08* | (2006.01) | |
| *C09K 8/035* | (2006.01) | |
| *C09K 8/54* | (2006.01) | |
| *C09K 8/62* | (2006.01) | |
| *B08B 3/04* | (2006.01) | |
| *B08B 3/00* | (2006.01) | |

(52) U.S. Cl.
CPC ............. *C09K 8/528* (2013.01); *B01D 41/04* (2013.01); *C09K 8/035* (2013.01); *C09K 8/54* (2013.01); *C09K 8/62* (2013.01); *C11D 1/72* (2013.01); *C11D 3/042* (2013.01); *C11D 3/2003* (2013.01); *C11D 3/2006* (2013.01); *C11D 3/2068* (2013.01); *C11D 3/2072* (2013.01); *C11D 3/30* (2013.01); *C11D 3/323* (2013.01); *C11D 7/50* (2013.01); *C11D 11/0023* (2013.01); *C11D 11/0041* (2013.01); *C11D 11/0052* (2013.01); *C23G 1/08* (2013.01); *B08B 3/00* (2013.01); *B08B 3/04* (2013.01)

(58) Field of Classification Search
CPC .. C11D 1/62; C11D 1/72; C11D 3/044; C11D 3/2068; C11D 11/0023
USPC ....... 510/238, 240, 422, 433, 504, 505, 506; 134/42
See application file for complete search history.

(56) References Cited

U.S. PATENT DOCUMENTS

| | | | | |
|---|---|---|---|---|
| 4,528,039 | A * | 7/1985 | Rubin ................ | C23G 1/22 134/2 |
| 5,750,482 | A * | 5/1998 | Cummings ............ | C11D 3/43 510/182 |
| 6,767,881 | B1 * | 7/2004 | Griese ................. | C11D 1/72 510/101 |
| 7,938,912 | B1 * | 5/2011 | MacDonald ......... | C11D 1/72 134/26 |
| 8,163,102 | B1 * | 4/2012 | MacDonald ......... | C11D 1/72 134/22.1 |
| 8,430,971 | B1 * | 4/2013 | MacDonald ......... | C11D 1/72 134/42 |
| 8,580,047 | B1 * | 11/2013 | MacDonald ......... | C11D 1/72 134/42 |
| 8,784,573 | B1 * | 7/2014 | MacDonald, III ...... | C11D 1/72 134/36 |
| 8,940,106 | B1 * | 1/2015 | MacDonald .......... | C11D 3/042 134/36 |
| 9,365,810 | B2 * | 6/2016 | MacDonald ......... | C11D 1/72 |
| 2001/0049347 | A1 * | 12/2001 | Robbins ............ | C11D 17/0043 510/238 |
| 2003/0064910 | A1 * | 4/2003 | Fong ................... | C11D 1/62 510/421 |
| 2005/0239674 | A1 * | 10/2005 | Dreja .................. | C11D 3/124 510/180 |
| 2006/0040843 | A1 * | 2/2006 | Kinnaird ............. | C11D 3/044 510/407 |

(Continued)

OTHER PUBLICATIONS

"Ethylene Glycol Ethers Information Update", p. 1-2, Jul. 2000.*
"Glycol Ether EB", Safety Data Sheet, p. 1-5, Nov. 2012.*

*Primary Examiner* — Gregory R Delcotto
(74) *Attorney, Agent, or Firm* — Stephen G. Anderson; GrayRobinson, P.A.

(57) ABSTRACT

A composition comprising a base, nonylphenol, at least one quaternary ammonium compound, and glycol ether EB is provided in a method for solubilizing calcium carbonate in an aqueous suspension or dispersion of calcium carbonate.

6 Claims, No Drawings

(56) References Cited

U.S. PATENT DOCUMENTS

| | | | |
|---|---|---|---|
| 2006/0293202 A1* | 12/2006 | Cate | C11D 17/041 |
| | | | 510/235 |
| 2007/0010414 A1* | 1/2007 | Cioletti | C11D 1/667 |
| | | | 510/190 |
| 2007/0251545 A1* | 11/2007 | Dreja | C11D 17/049 |
| | | | 134/15 |
| 2008/0127995 A1* | 6/2008 | Kinnaird | C11D 3/044 |
| | | | 134/6 |

* cited by examiner

UREA HYDROCHLORIDE COMPOSITIONS

CROSS-REFERENCE TO RELATED APPLICATIONS

This application is a divisional of and claims priority to U.S. patent application Ser. No. 14/593,333, filed Jan. 9, 2015, now U.S. Pat. No. 9,365,810, which is a continuation of and claims priority to U.S. patent application Ser. No. 14/142,975, filed Dec. 30, 2013, now U.S. Pat. No. 8,940,106, issued Jan. 27, 2015, which is a continuation-in-part patent application of U.S. patent application Ser. No. 14/048,559, filed Oct. 8, 2013, now U.S. Pat. No. 8,784,573, issued Jul. 22, 2014, which itself is a divisional application of U.S. patent application Ser. No. 13/856,469, filed Apr. 4, 2013, now U.S. Pat. No. 8,580,047, issued Nov. 12, 2013, which itself is a divisional application of U.S. patent application Ser. No. 13/453,871, filed Apr. 23, 2012, now U.S. Pat. No. 8,430,971, issued Apr. 30, 2013, which itself is a divisional application of U.S. patent application Ser. No. 13/104,180, filed May 10, 2011, now U.S. Pat. No. 8,163,102, issued Apr. 24, 2012, which itself is a continuation-in-part patent application of U.S. patent application Ser. No. 12/419,379, filed Apr. 7, 2009, now U.S. Pat. No. 7,938,912, issued May 20, 2011, the disclosures of which are herein incorporated by reference in their entirety, and all commonly owned.

FIELD OF THE INVENTION

The present invention relates to compositions and methods for treating fluids, and, more particularly to such compositions and methods for treating drilling fluids in industrial applications, hydraulic fracturing, solubilizing elements, and lowering salts.

BACKGROUND OF THE INVENTION

The removal of water-insoluble cementitious and lime materials from surfaces is known to be a difficult process. Compositions that have been known for use in the past have included acid (e.g., hydrochloric, hydrofluoric, phosphoric, and sulfuric) washes and urea hydrochloride solutions.

However, the solutions known in the art can cause corrosion and flash rusting to metal and metal alloy surfaces, and also can dissolve away surface coatings and underlying metals. Thus, the use of such compositions can decrease the life of a surface and its coating significantly. For example, when used on vehicles and other industrial and construction equipment, such compositions can greatly increase the frequency at which the treated surfaces must be re-painted, re-coated, or re-sealed.

Additionally, many prior known compositions are not environmentally safe, and contain components that are non-OSHA and -EPA compliant. Some jurisdictions have regulations as to materials that can be drained so as to ultimately reach ground water. Resource Conservation and Recovery Act (RCRA) metals are among those substances that are regulated, and include arsenic, barium, cadmium, chromium, lead, mercury, selenium, and silver. As an example, chromium is often used as a lustrous coating on bumpers, mirrors, hydraulic rams, and trim parts on vehicles such as concrete trucks. Since construction equipment is typically washed outdoors, the resulting process water usually drains directly into the ground, and, thus, if the equipment is coated with an RCRA or other undesirable material that can be released with the washing composition, the material will enter the groundwater.

Therefore, it would be beneficial to provide a composition and method of use that are effective at removing cementitious materials from surfaces without causing corrosion or rusting, which can damage the target surface and release harmful substances such as RCRA materials into the environment. Preferably the composition should also include components that are environmentally safe and OSHA- and EPA-compliant.

It would also be beneficial to provide an environmentally safe composition and method of use that are effective in assisting in performing hydraulic fracturing of an oil gas well, adjusting and maintaining the pH of process water and other fluids in industrial applications, and solubilizing calcium carbonate in an aqueous suspension or dispersion thereof.

SUMMARY OF THE INVENTION

The application provides a method for pickling treatments, electronic submersible pump treatments (ESPs), hydraulic fracturing, perforation cleaning and debris removal, toe preparation treatments that replace the use of acetic acid blends, cement squeeze treatments, injection well treatments, disposal well treatments, pH adjustment of recycled frac water and/or flow-back fluids, pH adjustment fluid to assist with the hydration of gelled based systems, breaking gelled fracturing systems to replace the use of dangerous oxidizing agents, using a fluid to unstick a drilling rig, acid fracture, spearhead acid squeeze soaking, and filter cake removal comprising:

solubilizing calcium carbonate in an aqueous suspension or dispersion of calcium carbonate, the method including the steps of
i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

A composition including HCl, urea, complex substituted keto-amine-hydrochloride, an alcohol, an ethoxylate, and a ketone is provided for performing hydraulic fracturing or oil or gas wells, solubilizing calcium carbonate, or lowering salt and bicarbonate levels in irrigation systems.

A method of using the composition includes applying the composition to a surface to release a cementitious material therefrom and removing the composition and released cementitious material from the surface.

The composition comprises an organic, cationic inhibitor for both corrosion and flash rusting that minimizes pitting and attack on metal and alloy surfaces, such as are common in construction equipment and trucks. As the composition is non-corrosive to metals, it has been deemed non-regulated by the U.S. Department of Transportation (DOT), and is environmentally safe and OSHA- and EPA-compliant. The composition has been shown to reduce corrosion levels to well below the DOT corrosion limits of 6.25 mmpy.

In an exemplary embodiment, the inhibitor, which is used at a level of approximately 0.5% in the composition, comprises 10-30% surfactant, 10-30% complex substituted keto-amine-hydrochloride, 1-10% 3-methyl butynol, 1-10% isopropyl alcohol, 1-10% methyl vinyl ketone, and <1% acetone. This inhibitor has been shown to substantially eliminate corrosion of target surfaces.

A method is also provided for performing hydraulic fracturing of oil or gas wells. The method comprises providing a composition comprising HCl, urea, complex substituted keto-amine-hydrochloride, an alcohol, an ethoxylate, and a ketone; and inserting the composition into an oil well or a gas well to assist in performing hydraulic fracturing thereof.

A method is further provided for adjusting a pH of a drilling fluid. The method comprises providing a composition comprising HCl, urea, complex substituted keto-amine-hydrochloride, an alcohol, an ethoxylate, and a ketone; and adding the composition to a drilling fluid for a well to assist in adjusting a pH thereof.

A method for adjusting and maintaining a pH of a process fluid comprises providing a composition comprising HCl, urea, complex substituted keto-amine-hydrochloride, an alcohol, an ethoxylate, and a ketone; and adding the composition to a process fluid to adjust and maintain a pH thereof.

A method for solubilizing calcium carbonate in an aqueous suspension or dispersion of calcium carbonate comprises providing a composition comprising HCl, urea, complex substituted keto-amine-hydrochloride, an alcohol, an ethoxylate, and a ketone; adding the composition to an aqueous suspension or dispersion of calcium carbonate; and permitting the composition to solubilize the aqueous suspension or dispersion of calcium carbonate.

A method for removing a foulant from a fluid-handling element comprises providing a composition comprising HCl, urea, complex substituted keto-amine-hydrochloride, an alcohol, an ethoxylate, and a ketone; adding the composition to a fouled fluid-handling element; and permitting the composition to solubilize the foulant.

A method for removing a foulant from a surface of a marine vessel comprises providing a composition comprising HCl, urea, complex substituted keto-amine-hydrochloride, an alcohol, an ethoxylate, and a ketone; applying the composition to a fouled surface of a marine vessel; and permitting the composition to solubilize the foulant.

A method for lowering a salt and bicarbonate level in an irrigation system comprises providing a composition comprising HCl, urea, complex substituted keto-amine-hydrochloride, an alcohol, an ethoxylate, and a ketone; diluting the composition to 5-60% by volume composition in water; adding the composition to a fouled fluid-transporting element of an irrigation system; and permitting the composition to solubilize the foulant.

A method for acidizing turf and for lowering a salt and bicarbonate level in at least one of turf and turf growing medium comprises providing a composition comprising HCl, urea, complex substituted keto-amine-hydrochloride, an alcohol, an ethoxylate, and a ketone; and adding the composition to at least one of turf and turf growing medium.

DETAILED DESCRIPTION OF EMBODIMENTS

In one embodiment according to the teachings of the present invention, a composition comprises HCl, urea, complex substituted keto-amine-hydrochloride, at least one alcohol, an ethoxylate, and a ketone. Preferably, the HCl and the urea are present in a range of: HCl, 40-60 wt %, and urea, 30-45 wt %, and, most preferably, at approximately HCl, 55 wt %, and urea, 42 wt %.

Preferably the alcohol comprises at least one of isopropyl alcohol and propargyl alcohol. In a particular embodiment, the isopropyl alcohol and propargyl alcohol are present at approximately isopropyl alcohol, 0.067 wt %, and propargyl alcohol, 0.022 wt %.

The ethoxylate can comprise ethoxylated nonylphenol, which can be present at approximately 0.022 wt %.

The ketone can comprise methyl vinyl ketone, which can present at approximately 0.022 wt %.

In a particular embodiment, the composition can comprise: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The composition can be used as a base for a plurality of dilution levels to be used for different applications. For example, sufficient water can be added to the composition to dilute the base in a range of 1:1 to 6:1 water:base.

A plurality of exemplary compositions using the composition described above can be used as a base for removing cementitious material from a variety of surfaces. For example, concrete can be removed from equipment with a composition comprising: base (25 wt %), nonylphenol 9.5 mole (0.25 wt %), quaternary ammonium compounds (0.15 wt %), glycol ether EB (0.20 wt %), and water (74.4 wt %). This formula can be used on, for example, ready-mixed concrete, cement, and masonry, although these uses are not intended to be limiting.

Another composition for use as concrete removing agent on equipment can comprise: base (35 wt %), nonylphenol 9.5 mole (0.25 wt %), quaternary ammonium compounds (0.15 wt %), glycol ether EB (0.20 wt %), and water (64.4 wt %). This formula can be used on, for example, ready-mixed concrete, cement, and masonry, although these uses are not intended to be limiting.

Yet another composition can be used as an efflorescence remover on cementitious materials (concrete block, brick, precast, paver, cement, and masonry). An exemplary formula for this composition is: base (15 wt %), nonylphenol 9.5 mole (0.25 wt %), quaternary ammonium compounds (0.15 wt %), glycol ether EB (0.20 wt %), and water (84.4 wt %). This formula can be used on, for example, concrete block, brick, precast, cement, and masonry, although these uses are not intended to be limiting.

A basic composition for use as a concrete removing agent on tools and equipment includes base (25 wt %) and water (75 wt %). This formula can be used on, for example, ready-mixed concrete, cement, and masonry, although these uses are not intended to be limiting.

Another composition for use as a concrete removing agent on equipment comprises base (60.0 wt %), nonylphenol 9.5 mole (0.25 wt %), quaternary ammonium compounds (0.15 wt %), glycol ether EB (0.20 wt %), and water (39.4 wt %). This formula can be used on, for example, ready-mixed concrete, cement, and masonry, although these uses are not intended to be limiting.

DEFINITIONS

The term "alcohol", as used herein, unless otherwise indicated, includes a compound in which the hydroxyl functional group (—OH) is bound to a carbon atom. In particular, this carbon center should be saturated, having single bonds to three other atoms. For example, ethanol, isopropanol, propanol, butanol, propargyl alcohol, nonylphenol and the like.

The term "ethoxylated" as used herein refers to the incorporation of an ethoxy moiety to a given substrate structure, wherein ethoxy refers to the structure CH3CH2O-, wherein the ethoxy group is bound through the oxygen atom. For example, ethoxylated nonylphenol. The term "ethoxylate" refers to the anionic form of ethoxy or an ethoxylated compound in salt form.

The term "ketone" as used herein refers to a radical having the structure —C(O)—R1 (such as acetyl, —C(O)CH3) or —R1-(O)—R2-. The ketone can be attached to another group through R1 or R2. R1 or R2 can be alkyl, alkenyl, alkynyl, cycloalkyl, heterocyclyl or aryl, for example methyl vinyl ketone or acetophenone, or R1 or R2 can be joined to form a 3- to 12-membered ring.

The term "keto-amine" as used herein refers to chemical moieties containing the structure —C(=O)—N(R1)R2 wherein R1 and R2 are independently H, a bond, lower alkyl, cycloalkyl, phenyl or heterocycloalkyl. The keto-amine can be attached to another group through R1 or R2. R1 or R2 can be alkyl, alkenyl, alkynyl, cycloalkyl, heterocyclyl or aryl, or R1 or R2 can be joined to form a 3- to 12-membered ring.

The term "keto-amine hydrochloride" as used herein refers to the hydrochloride salt of the keto-amine as above described.

The application provides a method for solubilizing calcium carbonate in an aqueous suspension or dispersion of calcium carbonate, the method comprising:
    providing a composition comprising HCl, urea, complex substituted keto-amine-hydrochloride, an alcohol, an ethoxylate, and a ketone;
    adding the composition to an aqueous suspension or dispersion of calcium carbonate; and
    permitting the composition to solubilize the aqueous suspension or dispersion of calcium carbonate.

The application provides the above method, wherein the alcohol comprises at least one of isopropyl alcohol and propargyl alcohol.

The application alternatively provides the above method, wherein the ethoxylate comprises ethoxylated nonylphenol and the ketone comprises methyl vinyl ketone.

The application alternatively provides the above method, further comprising diluting the composition by 20-90% by volume composition in water prior to the composition adding step.

The application alternatively provides the above method, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application alternatively provides any one of the above methods, wherein the composition is used for pickling treatments.

The application alternatively provides any one of the above methods, wherein the composition is used for electronic submersible pump treatments (ESPs).

The application alternatively provides any one of the above methods, wherein the composition is used for hydraulic fracturing.

The application alternatively provides any one of the above methods, wherein the composition is used for perforation cleaning and debris removal.

The application alternatively provides any one of the above methods, wherein the composition is used for toe preparation treatments that replace the use of acetic acid blends.

The application alternatively provides any one of the above methods, wherein the composition is used for cement squeeze treatments.

The application alternatively provides any one of the above methods, wherein the composition is used for injection well treatments.

The application alternatively provides any one of the above methods, wherein the composition is used for disposal well treatments.

The application alternatively provides any one of the above methods, wherein the method is used for pH adjustment of recycled frac water and/or flow-back fluids.

The application alternatively provides any one of the above methods, wherein the method is used for pH adjustment fluid to assist with the hydration of gelled based systems.

The application alternatively provides any one of the above methods, wherein the composition is used for breaking gelled fracturing systems to replace the use of dangerous oxidizing agents.

The application alternatively provides any one of the above methods, wherein the composition is used for a treatment fluid to unstick a drilling rig.

The application alternatively provides any one of the above methods, wherein the composition is used for acid fracture.

The application alternatively provides any one of the above methods, wherein the composition is used for spearhead acid squeeze soaks.

The application alternatively provides any one of the above methods, wherein the composition is used for filter cake removal.

The application provides a method for pickling treatments comprising:
    solubilizing calcium carbonate in an aqueous suspension or dispersion of calcium carbonate, the method including the steps of
        i) providing a composition comprising HCl, urea, complex substituted keto-amine-hydrochloride, an alcohol, an ethoxylate, and a ketone;
        ii) adding the composition to an aqueous suspension or dispersion of calcium carbonate; and
        iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for electronic submersible pump treatments (ESPs) comprising:
solubilizing calcium carbonate in an aqueous suspension or dispersion of calcium carbonate, the method including the steps of
 i) providing a composition comprising HCl, urea, complex substituted keto-amine-hydrochloride, an alcohol, an ethoxylate, and a ketone;
 ii) adding the composition to an aqueous suspension or dispersion of calcium carbonate; and
 iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for hydraulic fracturing comprising:
solubilizing calcium carbonate in an aqueous suspension or dispersion of calcium carbonate, the method including the steps of
 i) providing a composition comprising HCl, urea, complex substituted keto-amine-hydrochloride, an alcohol, an ethoxylate, and a ketone;
 ii) adding the composition to an aqueous suspension or dispersion of calcium carbonate; and
 iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for perforation cleaning and debris removal comprising:
solubilizing calcium carbonate in an aqueous suspension or dispersion of calcium carbonate, the method including the steps of
 i) providing a composition comprising HCl, urea, complex substituted keto-amine-hydrochloride, an alcohol, an ethoxylate, and a ketone;
 ii) adding the composition to an aqueous suspension or dispersion of calcium carbonate; and
 iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for toe preparation treatments that replace the use of acetic acid blends comprising:
solubilizing calcium carbonate in an aqueous suspension or dispersion of calcium carbonate, the method including the steps of
 i) providing a composition comprising HCl, urea, complex substituted keto-amine-hydrochloride, an alcohol, an ethoxylate, and a ketone;
 ii) adding the composition to an aqueous suspension or dispersion of calcium carbonate; and
 iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for cement squeeze treatments comprising:
solubilizing calcium carbonate in an aqueous suspension or dispersion of calcium carbonate, the method including the steps of i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for injection well treatments comprising:
solubilizing calcium carbonate in an aqueous suspension or dispersion of calcium carbonate, the method including the steps of
i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for disposal well treatments comprising:
solubilizing calcium carbonate in an aqueous suspension or dispersion of calcium carbonate, the method including the steps of
i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for pH adjustment of recycled frac water and/or flow-back fluids comprising:
solubilizing calcium carbonate in an aqueous suspension or dispersion of calcium carbonate, the method including the steps of
i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for pH adjustment fluid to assist with the hydration of gelled based systems comprising:
solubilizing calcium carbonate in an aqueous suspension or dispersion of calcium carbonate, the method including the steps of
i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for breaking gelled fracturing systems to replace the use of dangerous oxidizing agents comprising:
 solubilizing calcium carbonate in an aqueous suspension or dispersion of calcium carbonate, the method including the steps of
  i) providing a composition comprising HCl, urea, complex substituted keto-amine-hydrochloride, an alcohol, an ethoxylate, and a ketone;
  ii) adding the composition to an aqueous suspension or dispersion of calcium carbonate; and
  iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method using a fluid to unstick a drilling rig comprising:
 solubilizing calcium carbonate in an aqueous suspension or dispersion of calcium carbonate, the method including the steps of
  i) providing a composition comprising HCl, urea, complex substituted keto-amine-hydrochloride, an alcohol, an ethoxylate, and a ketone;
  ii) adding the composition to an aqueous suspension or dispersion of calcium carbonate; and
  iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for acid fracture comprising:
 solubilizing calcium carbonate in an aqueous suspension or dispersion of calcium carbonate, the method including the steps of
  i) providing a composition comprising HCl, urea, complex substituted keto-amine-hydrochloride, an alcohol, an ethoxylate, and a ketone;
  ii) adding the composition to an aqueous suspension or dispersion of calcium carbonate; and
  iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for spearhead acid squeeze soaking comprising:
 solubilizing calcium carbonate in an aqueous suspension or dispersion of calcium carbonate, the method including the steps of
  i) providing a composition comprising HCl, urea, complex substituted keto-amine-hydrochloride, an alcohol, an ethoxylate, and a ketone;
  ii) adding the composition to an aqueous suspension or dispersion of calcium carbonate; and
  iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The application provides a method for filter cake removal comprising:
 solubilizing calcium carbonate in an aqueous suspension or dispersion of calcium carbonate, the method including the steps of i) providing a composition comprising HCl, urea, complex substituted keto-amine-hydrochloride, an alcohol, an ethoxylate, and a ketone;
ii) adding the composition to an aqueous suspension or dispersion of calcium carbonate; and
iii) permitting the composition to solubilize the aqueous suspension or dispersion of calcium carbonate.

The application provides the above method, wherein the alcohol comprises at least one of isopropyl alcohol and propargyl alcohol.

The application provides any of the above methods, wherein the ethoxylate comprises ethoxylated nonylphenol and the ketone comprises methyl vinyl ketone.

The application provides any of the above methods, further comprising diluting the composition by 20-90% by volume composition in water prior to the composition adding step.

The application provides any of the above methods, wherein the composition comprises: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

A method for performing hydraulic fracturing of an oil or a gas well comprises providing a composition such as that described above and inserting the composition into an oil well or a gas well to assist in performing hydraulic fracturing thereof.

A method for adjusting a pH of a drilling fluid comprises providing a composition such as described above and adding the composition to a drilling fluid for a well to assist in adjusting a pH thereof. The composition can be diluted to 20-90% by volume composition in water.

A method for adjusting and maintaining a pH of a process fluid comprises providing a composition such as described above and adding the composition to a process fluid to adjust and maintain a pH thereof. The process fluid can comprise at least one of a processing fluid for textiles, a processing fluid for paper manufacturing, industrial process water, waste water, industrial discharge water, and industrial recycling water. The composition can be diluted by 10-85% by volume composition in water, for example.

A method for solubilizing calcium carbonate in an aqueous suspension or dispersion of calcium carbonate comprises providing a composition such as described above and adding the composition to an aqueous suspension or dispersion of calcium carbonate. The composition is permitted to solubilize the aqueous suspension or dispersion of calcium carbonate. The composition can be diluted by 10-95% by volume composition in water, for example.

A method for removing a foulant from a fluid-handling element comprises providing a composition comprising HCl, urea, complex substituted keto-amine-hydrochloride, an alcohol, an ethoxylate, and a ketone; adding the composition to a fouled fluid-handling element; and permitting the composition to solubilize the foulant.

In one sub-embodiment, the fluid-handling element can comprise a waste plumbing system and the foulant can comprise a salt of at least one of calcium and magnesium. In this embodiment the composition can be diluted prior to the adding step to 10-65% by volume composition in water.

In another sub-embodiment, the fluid-handling element can comprise an industrial boiler system and the foulant can comprise a salt of at least one of calcium and magnesium. In this embodiment the composition can be diluted prior to the adding step by 5-70% by volume composition in water.

In a further sub-embodiment, the fluid-handling element can comprise a plumbing element of a marine vessel and the foulant can comprise at least one of a salt of at least one of calcium and magnesium, a marine organism such as arthropods such as cirripedia or crustaceans, and sludge. In this embodiment the composition can be diluted prior to the adding step by 5-80% by volume composition in water. Here the plumbing element can comprises a waste plumbing element, and the diluting can comprise diluting the composition by 10-65% by volume composition in water. The plumbing element can also comprise an internal plumbing element, and the diluting can comprise diluting the composition by 5-50% by volume composition in water. Alternatively, the plumbing element can comprise an element in a propulsion system, such as, but not intended to be limited to, inboard, outboard, inboard/outboard, surface drive, or jet drive propulsion engine systems, and the diluting can comprise diluting the composition by 5-80% by volume composition in water.

A method for removing a foulant from a surface of a marine vessel comprises providing a composition comprising HCl, urea, complex substituted keto-amine-hydrochloride, an alcohol, an ethoxylate, and a ketone; applying the composition to a fouled surface of a marine vessel; and permitting the composition to solubilize the foulant. The surface can comprise, for example, a marine hull. If desired, the composition can be diluted by 5-95% by volume composition in water. The foulant can comprise at least one of a salt of at least one of calcium and magnesium, a marine organism such as arthropods such as cirripedia or crustaceans, and sludge.

A method for lowering a salt and bicarbonate level in an irrigation system comprises providing a composition comprising HCl, urea, complex substituted keto-amine-hydrochloride, an alcohol, an ethoxylate, and a ketone; diluting the composition to 5-60% by volume composition in water; adding the composition to a fouled fluid-transporting element of an irrigation system; and permitting the composition to solubilize the foulant.

A method for acidizing turf and for lowering a salt and bicarbonate level in at least one of turf and turf growing medium comprises providing a composition comprising HCl, urea, complex substituted keto-amine-hydrochloride, an alcohol, an ethoxylate, and a ketone; and adding the composition to at least one of turf and turf growing medium. The composition can be diluted to 1-35% by volume composition in water.

A method for acid fracturing in a cased or open hole via single or multistage wherein the formation of fracture pressure is a key technological improvement for stimulation in many types of vertical or horizontal well formations, wherein this technology can be used in place of typical mineral or organic acids as are typically used in such applications.

A method for filter cake removal wherein the reservoir production is activated without damaging the formation after drilling. Wherein, this technology can be used to remove the filter cake produced during the drilling procedure.

A method of pumping a volume of acid prior to a volume of fluid to facilitate the cleaning of perforations and assist in the lowering of pressures required to break a formation.

A method stimulate a well to improve flow or to remove damage whereby acid is injected into the well, penetrating the rock pores at pressures below fracture pressure, wherein the acids dissolve the sediments and mud solids in the pores of the rocks preventing permeability of the rock.

A method that to restore permeability by removing damage around a wellbore with acid or matrix acid thereby improving sandstone and carbonate well productivity.

A method for removal of scale or other deposits from perforation and other perforations associated with well completion, A method of using acid to treat scaling issues, usually calcium based, in wells that are used to produce water with the oil or gas or wells in which water is injected back into the ground.

A method of using acid to lower the pH of any fluid system in the production of oil or gas.

One of skill in the art will recognize that these compositions and methods of use are not intended to be limiting, and variations in ingredients, proportions, and methods of use can be made without departing from the spirit of the invention.

Having now described the invention and use of preferred embodiments thereof, and the advantageous new and useful results obtained thereby, the new and useful constructions, and reasonable equivalents thereof obvious to those skilled in the art, are set forth in the appended claims.

What is claimed is:

1. A composition comprising a base, nonylphenol 9.5 mole, at least one quaternary ammonium compound, ethylene glycol monobutyl ether, and water, wherein the base comprises HCl, urea, complex substituted keto-amine-hydrochloride, at least one alcohol, an ethoxylate, and at least one ketone.

2. The composition as described in claim 1, wherein the base is present in an amount of 15, 25, 35, or 60 wt %, nonylphenol 9.5 mole is present at 0.25 wt %, the at least one quaternary ammonium compound is present at 0.15 wt %, and glycol ether is present at 0.20 wt %.

3. A method for removing cementitious material from a surface, the method comprising:
    contacting a cementitious material with a composition according to claim 1.

4. The method of claim 3, wherein the base is present at in an amount of 15, 25, 35, or 60 wt %, nonylphenol 9.5 mole is present 0.25 wt %, the at least one quaternary ammonium compound is present at 0.15 wt %, and glycol ether is present at 0.20 wt %.

5. The composition as described in claim 1, wherein the base comprises HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

6. The composition as described in claim 2, wherein the base comprises HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

* * * * *